United States Patent

Chen

(10) Patent No.: US 8,004,412 B2
(45) Date of Patent: Aug. 23, 2011

(54) ELECTRONIC DEVICE CAPABLE OF IDENTIFYING EXTERNAL ANTENNAS AND RELATED EXTERNAL ANTENNA MODULE

(75) Inventor: Yin-Yu Chen, Taipei Hsien (TW)

(73) Assignee: Wistron Corporation, Xizhi, Dist, New Taipei (TW)

( * ) Notice: Subject to any disclaimer, the term of this patent is extended or adjusted under 35 U.S.C. 154(b) by 422 days.

(21) Appl. No.: 12/139,514

(22) Filed: Jun. 16, 2008

(65) Prior Publication Data

US 2009/0066479 A1  Mar. 12, 2009

(30) Foreign Application Priority Data

Sep. 10, 2007 (TW) .............................. 96133703 A

(51) Int. Cl.
  *G08B 13/14* (2006.01)
(52) U.S. Cl. .................. 340/572.7; 340/693.5; 340/10.1
(58) Field of Classification Search ............... 340/572.7, 340/572.1–572.6, 572.8–572.9, 693.5, 988, 340/10.1–10.3
See application file for complete search history.

(56) References Cited

U.S. PATENT DOCUMENTS

| | | | | |
|---|---|---|---|---|
| 5,270,704 | A * | 12/1993 | Sosa Quintana et al. | 340/870.02 |
| 6,087,952 | A * | 7/2000 | Prabhakaran | 340/693.5 |
| 6,891,504 | B2 | 5/2005 | Cheng et al. | |
| 7,469,128 | B2 * | 12/2008 | Pasternak et al. | 455/86 |
| 7,576,657 | B2 * | 8/2009 | Duron et al. | 340/572.7 |
| 7,667,643 | B2 * | 2/2010 | Handermann et al. | 342/357.1 |
| 2002/0158133 | A1 * | 10/2002 | Conzola et al. | 235/462.45 |
| 2006/0005035 | A1 * | 1/2006 | Coughlin | 713/182 |
| 2007/0282908 | A1 * | 12/2007 | Van der Meulen et al. | 707/104.1 |
| 2011/0031821 | A1 * | 2/2011 | Greene et al. | 307/154 |

* cited by examiner

*Primary Examiner* — Daniel Previl
(74) *Attorney, Agent, or Firm* — Winston Hsu; Scott Margo

(57) ABSTRACT

An electronic device with external antenna identification function includes a plurality of external antenna modules, each of which includes an antenna and an identification tag unit for generating a specific identification signal to identify the external antenna module according to a query signal, a connection port, a identification tag authorizing module, coupled to the connection port, for outputting the query signal when one of the plurality of external antenna modules is connected to the connection port and for generating a identification result according to the specific identification signal generated by the external antenna module, and a radio transceiver module, coupled to the connection port and the identification tag authorizing module, for transmitting and receiving corresponding radio signals according to the identification result.

12 Claims, 2 Drawing Sheets

ELECTRONIC DEVICE CAPABLE OF IDENTIFYING EXTERNAL ANTENNAS AND RELATED EXTERNAL ANTENNA MODULE

BACKGROUND OF THE INVENTION

1. Field of the Invention

The invention relates to an electronic device capable of identifying external antennas, and more particularly, to an electronic device capable of automatically identifying connected external antenna modules by reading identification tags set on the external antenna modules.

2. Description of the Prior Art

In order to satisfy all kinds of applications and wireless communications demands, when designing antennas of mobile terminal apparatuses, signal frequencies, being received or transmitted, have to be taken into consideration for meeting specification requirements of wireless techniques, such as wireless local-area networking (WLAN), Bluetooth, mobile communications, global positioning system (GPS), digital TV and worldwide interoperability for microwave access (WiMAX), etc. Furthermore, for hand-held mobile terminal apparatuses like mobile telephones, personal digital assistants (PDA) or ultra mobile PC (UMPC), the weight and the volume have to be reduced as much as possible for increasing the carrying convenience. Thus, how to design multi-frequency antennas in limited spaces of the hand-held mobile terminal apparatuses is a major challenge.

In this case, external antenna design can be a primary consideration for achieving the expected performance. Generally speaking, external antennas have to be connected to radio transceivers of the mobile terminal apparatuses through specific connection ports for receiving and transmitting corresponding radio signals. Therefore, multiple connection ports are required to be set on the mobile terminal apparatuses for each kind of the external antennas. However, with the increase of the wireless technique specifications, doing this not only increases the volume of the mobile terminal apparatuses, but also confuses the users.

Certainly, in order to connect the mobile terminal apparatuses through signal connection port, the external antennas can also be realized as built-in antennas, which integrate various antenna functions into a single external antenna module for receiving and transmitting radio signals corresponding to each kind of wireless technique specifications. Nevertheless, it not only increases the design difficulties, but also can be considered to be a waste when integrating all kinds of antenna functions corresponding to each wireless technique specifications into a single external antenna module.

SUMMARY OF THE INVENTION

It is therefore an objective of the present invention to provide an electronic device capable of identifying external antennas and related external antenna modules.

The present invention discloses an electronic device with external antenna identification functions. The electronic device comprises a connection port for being plugged in an external antenna module; an identification tag authorizing module, coupled to the connection port, for reading an identification signal from the plugged external antenna module and outputting an identification result corresponding to the plugged external antenna module; and a radio transceiver module, coupled to the connection port and the identification tag authorizing module, for transmitting and receiving radio signals according to the identification result.

The present invention further discloses an external antenna module. The external antenna module comprises a signal terminal for connecting to an electronic device; an antenna, coupled to the signal terminal, for transmitting and receiving corresponding radio signals; and an identification tag unit, coupled to the signal terminal, for generating a specific identification signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
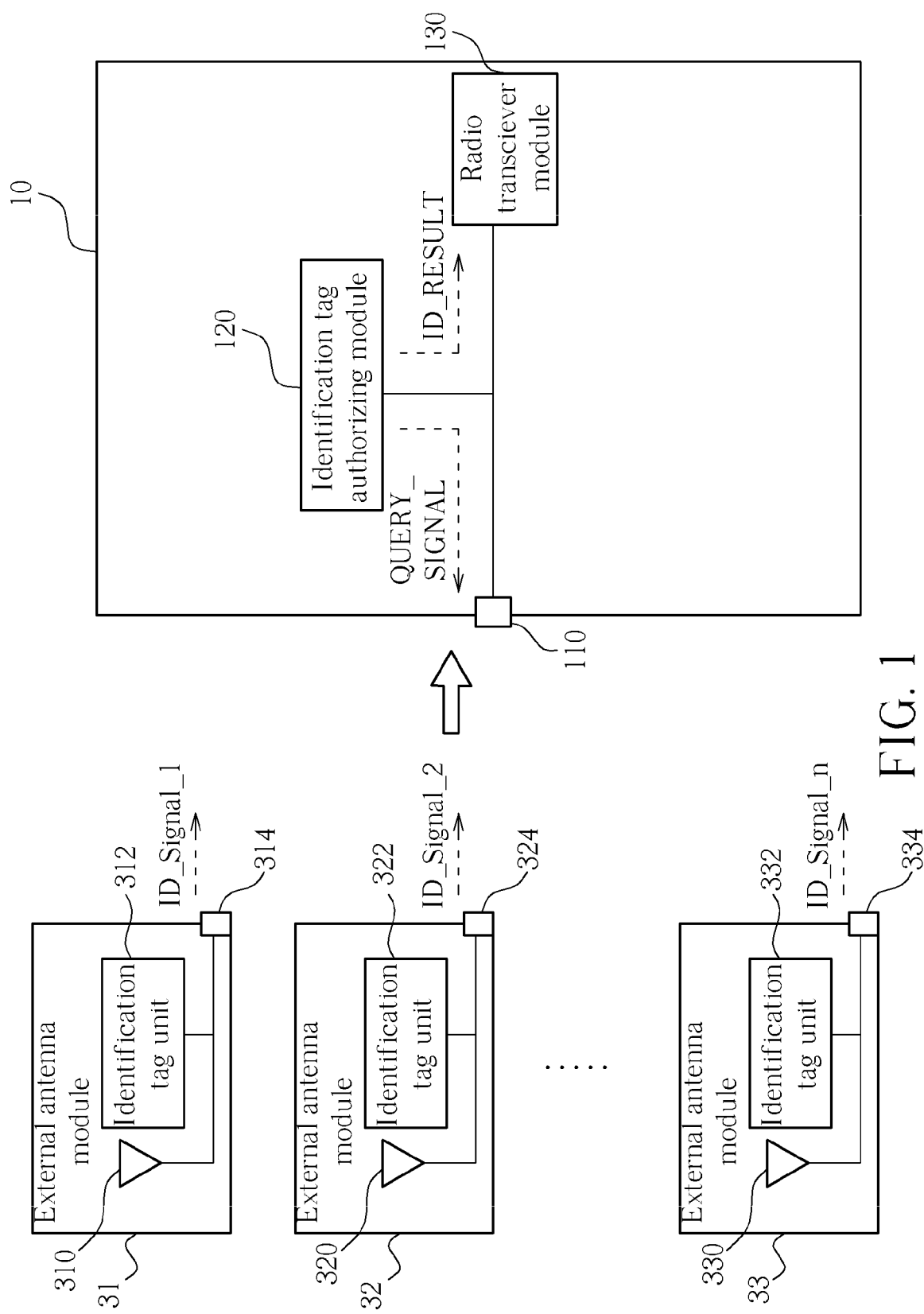
FIG. 1 is a schematic diagram of an electronic device with external antenna identification functions and external antenna modules corresponding to the electronic device according to the present invention.

Please refer to FIG. 1. FIG. 1 is a schematic diagram of an electronic device 10 with external antenna identification functions and external antenna modules 31, 32 and 33 corresponding to the electronic device 10 according to the present invention. The electronic device 10 includes a connection port 110, an identification tag authorizing module 120 and a radio transceiver module 130.

The external antenna modules 31, 32 and 33 individually include antennas 310, 320 and 330, identification tag units 312, 322 and 332 and connection ports 314, 324 and 334. The connection ports 314, 324 and 334 are utilized for detachably connecting to the connection port 110 of the electronic device 10, respectively, and thus the electronic device 10 can read interior data of the external antenna modules 31, 32 and 33 through the connection port 110. The detailed description is illustrated in the following.

Since it is difficult to integrate all kinds of antenna functions with current wireless technique specifications capability into a single external antenna module, the external antenna modules 31, 32 and 33 can be implemented by external antenna modules with different signal antenna functions corresponding to at least one of the wireless technique specifications combining various antenna functions that need to be used according to practical needs. For example, the external antenna module 31 can be an antenna module with a global positioning system (GPS) function and a digital TV function, the external antenna module 32 can be an antenna module with functions of GPS and mobile phone, or the external antenna module 33 can be an antenna module with functions of GPS, mobile phones and digital TV and so on.

Additionally, each of the external antenna modules 31, 32 and 33 can be allotted a specific identification tag. Thus, based on the specific identification tags, the electronic device 10 can control the radio transceiver module 130 to send and receive corresponding radio signals for optimally achieving the efficiency and utilization. Therefore, the present invention can effectively meet requirements of all kinds of wireless technique specifications, and only needs signal or few connection ports, so as to enhance the usage convenience and significantly reduce the antenna design difficulty.

Preferably, the electronic device 10 of the present invention can be a mobile electronic device such as a portable computer, a personal digital assistant (PDA) or an ultra mobile personal computer (UMPC). The identification tag authorizing module 120 of the electronic device 10 is utilized for reading stored data of the identification tag units 312, 322 or 332 of the external antenna modules 31, 32 or 33 respectively. When the connection port 314, 324 or 334 of the external antenna module 31, 32 or 33 is connected to the connection port 110 of the electronic device 10, the identification tag authorizing module 120 outputs a query signal(QUERY_SIGNAL) to the identification tag unit 312, 322 or 332. Then, the identification tag unit 312, 322 or 332 can generate and output a corresponding identification signal(ID_Signal_1, ID_Signal_2 or ID_Signal_n) back to the identification tag authorizing module 120 according to the query signal QUERY_SIGNAL.

For example, when the user connects the external antenna module 31 to the connection port 110 of the electronic device 10, the identification tag authorizing module 120 can identify the antenna type of the connected external antenna module 31 then generate the identification result ID_RESULT according to the identification signal ID_Signal_1 outputted by the identification tag unit 310. When receiving the identification result ID_RESULT outputted by the identification tag authorizing module 120, the radio transceiver module 130 can be set to receive and send modules corresponding to the external antenna module 31, such as can be switched to receive and send GPS and digital TV signals.

Similarly, when the external antenna module 32 with the other antenna functions is connected to the electronic device 10 and the identification signal ID_Signal_2 is received, the radio transceiver module 130 can be switched to receive and send corresponding radio signals for simultaneously providing the functions of GPS and mobile phone for the electronic device 10. Of course, the radio transceiver module 130 must have capabilities of sending and receiving the radio signals corresponding to the above-mentioned wireless functions, but it is not the main concern of the present invention and thus is not narrated herein.

Figure 2:
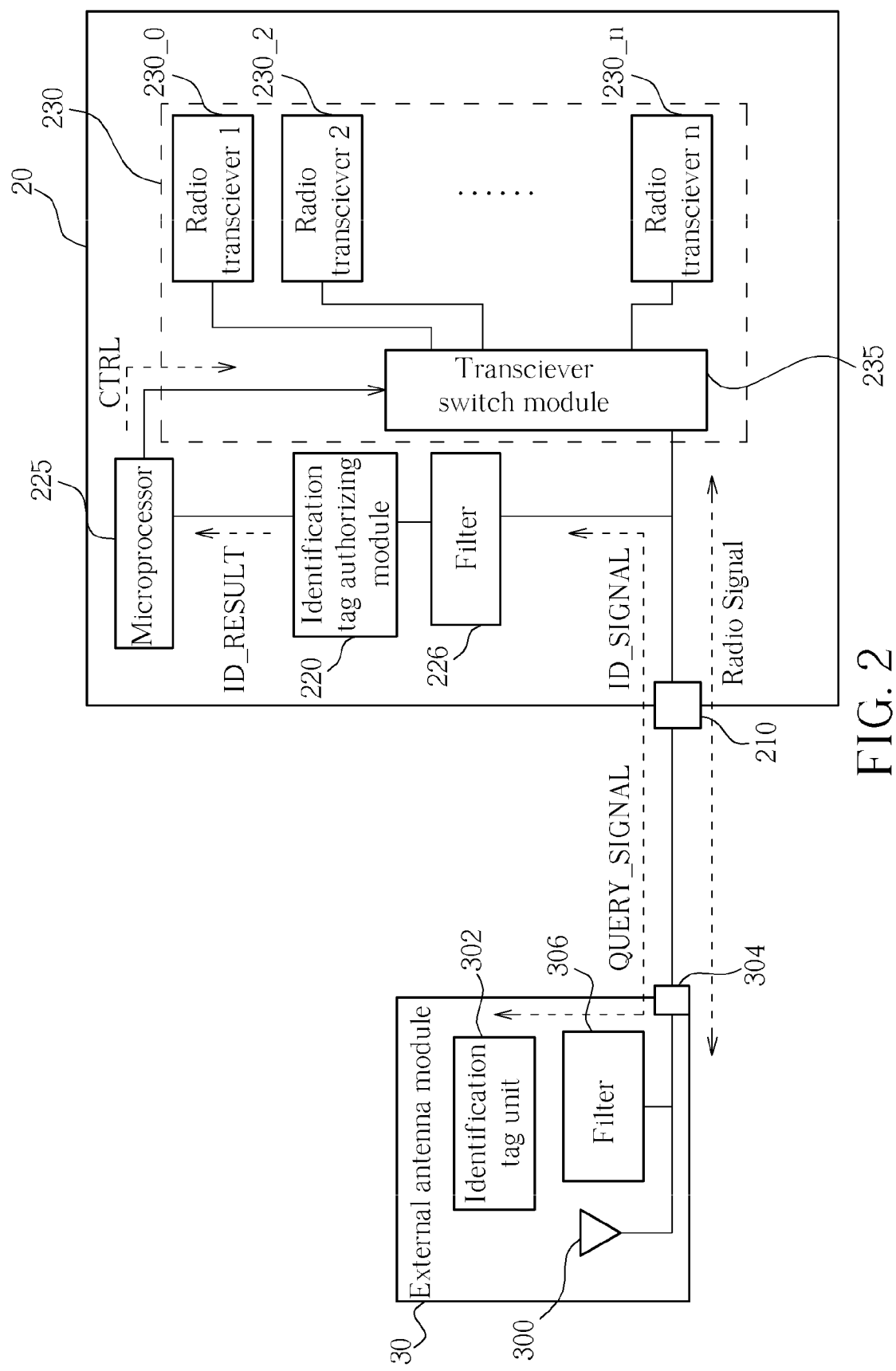
FIG. 2 is a schematic diagram of an electronic device with external antenna identification functions and an external antenna module corresponding to the electronic device according to an embodiment of the present invention.

Please refer to FIG. 2. FIG. 2 is a schematic diagram of an electronic device 20 with external antenna identification functions and an external antenna module 30 corresponding to the electronic device 20 according to an embodiment of the present invention. The electronic device 20 includes a connection port 210, an identification tag authorizing module 220, a microprocessor 225 and a radio transceiver module 230.

The external antenna module 30 includes an antenna 300, an identification tag unit 302, a connection port 304 and a filter 306. The filter 306 is coupled between the connection port 304 and the identification tag unit 302, and is utilized for filtering signals received from the connection port 304 to acquire a query signal QUERY_SIGNAL outputted by the electronic device 20. Thus, the identification tag unit 302 can generate and output a specific identification signal ID_SIGNAL back to the electronic device 20 according to the QUERY_SIGNAL.

The identification tag authorizing module 220 can further include a filter 226. The filter 226 is coupled to the connection port 210, and is utilized for filtering signals received from the connection port 210 to acquire the identification signal ID_SIGNAL when the external antenna module 30 is connected to the connection port 210. The microprocessor 225 is coupled between the identification tag authorizing module 220 and the radio transceiver module 230, and is utilized for generating a control signal CTRL to control the transceiver module 230 for receiving and transmitting corresponding radio signals according to the identification result ID_RESULT outputted by the identification tag authorizing module 220.

Compared with FIG. 1, the radio transceiver module 230 further includes radio transceivers $230\_0$-$230\_n$ and a transceiver switch module 235. Each of the radio transceivers $230\_0$-$230\_n$ is utilized for sending and receiving a specific radio signal, respectively. The transceiver switch module 235 is coupled to the connection port 210, the identification tag authorizing module 220 and the radio transceivers $230\_0$-$230\_n$, and is utilized for switching one of the radio transceivers $230\_0$-$230\_n$ to send and receive the radio signals through the external antenna module 30 according to the control signal CTRL generated by the microprocessor 225.

Preferably, the identification tag unit 302 of the external antenna module 30 can be realized by a passive tag similar to that of the radio frequency identification (RFID) technique, or can be realized by a simple resonant circuit composed by passive elements like inductors or capacitors. For example, when the identification tag unit 302 is realized by the passive tag, the query signal QUERY_SIGNAL generated by the identification tag authorizing module 220 can be transmitted to the identification tag unit 302 for providing operation power of the passive tag (i.e. the identification tag unit 302), and then be modulated to generate the corresponding identification signal ID_SIGNAL.

Then, the identification tag authorizing module 22 can check and decode the identification signal ID_SIGNAL returned by the identification tag unit 302 for generating the identification result ID_RESULT to the microprocessor 225. Thus, the microprocessor 225 can generate the control signal CTRL to control the transceiver switch module 235 to switch on corresponding transceivers of the radio transceivers $230\_0$-$230\_n$ according to the identification result ID_RESULT outputted by the external antenna module 30, so that the electronic device 20 can receive and send the corresponding radio signals through the external antenna module 30.

Certainly, the electronic device 20 can further include a built-in antenna (not shown in FIG. 2). The built-in antenna is coupled to the transceiver switch module 235, and is preferred to be a multi-frequency antenna for receiving and sending various kinds of radio signals when in good receiving conditions. If the receiving conditions turn worse, the present invention can plug the external antenna module for enhancing the transmission and reception capability. In this case, the connection between the built-in antenna and the radio transceiver module 230 can be interrupted after the electronic device 20 identifies the external antenna module 30 and switches on the corresponding transceivers of the radio transceivers $230\_0$-$230\_n$.

As mentioned above, the present invention respectively sets the identification tag unit and the identification tag authorizing module on the external antenna module and the mobile terminal apparatuses, and thus can automatically identity the connected external antenna module for receiving and transmitting corresponding radio signals. Therefore, the present invention can effectively meet requirements of all kinds of wireless technique specifications, and only needs signal or few connection ports, so as to enhance the usage convenience and reduce the antenna design difficulty significantly.

Those skilled in the art will readily observe that numerous modifications and alterations of the device and method may be made while retaining the teachings of the invention.

What is claimed is:

1. An electronic device with external antenna identification functions comprises:
    a connection port for being detachably connected to an external antenna module;
    an identification tag authorizing module, coupled to the connection port, for reading an identification signal from the connected external antenna module and outputting an identification result corresponding to the connected external antenna module; and
    a radio transceiver module, coupled to the connection port and the identification tag authorizing module, for sending and receiving radio signals according to the identification result.

2. The electronic device of claim 1, wherein the identification tag authorizing module further outputs a query signal for enabling the generation of the identification signal from the external antenna module.

3. The electronic device of claim 2, wherein the external antenna module comprises:
    a signal terminal for detachable connecting to the electronic device;
    an antenna, coupled to the signal terminal, for sending and receiving the corresponding radio signals; and
    an identification tag unit, coupled to the signal terminal, for generating the identification signal according to the query signal.

4. The electronic device of claim 3, wherein the external antenna module further comprises a filter, coupled between the signal terminal and the identification tag unit, for filtering signals received from the signal terminal to acquire the query signal.

5. The electronic device of claim 3, wherein the identification tag unit is a passive identification tag.

6. The electronic device of claim 3, wherein the identification tag unit is a resonant circuit having a specific frequency response.

7. The electronic device of claim 1, wherein the identification tag authorizing module further comprises a filter, coupled to the connection port, for filtering signals received from the connection port to acquire the identification signal when the external antenna module is connected into the connection port.

8. The electronic device of claim 1, wherein the radio transceiver module further comprises:
    a plurality of radio transceivers, each of which is utilized for transmitting and receiving a specific radio signal, respectively; and
    a transceiver switch module, coupled to the connection port, the identification tag authorizing module and the plurality of radio transceivers, for switching one of the plurality of radio transceivers to send and receive the radio signals according to the identification result outputted by the identification tag authorizing module.

9. The electronic device of claim 8 further comprises a microprocessor, coupled between the identification tag authorizing module and the transceiver switch module, for generating a control signal to control the transceiver switch module according to the identification result outputted by the identification tag authorizing module.

10. The electronic device of claim 1 further comprises a built-in antenna, coupled to the radio transceiver module.

11. The electronic device of claim 10, wherein a connection between the built-in antenna and the radio transceiver module is interrupted when the radio transceiver module transmits and receives the radio signals according to the identification result.

12. The electronic device of claim 1 is an ultra mobile personal computer (UMPC).

* * * * *